P. J. SMITH.
STEERING GEAR FOR MOTOR VEHICLES.
APPLICATION FILED MAY 31, 1913.
1,126,111.
Patented Jan. 26, 1915.
2 SHEETS—SHEET 1.
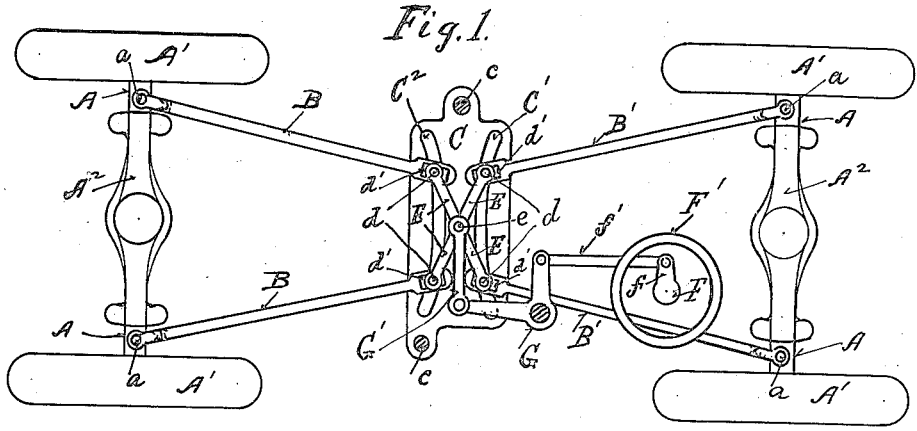
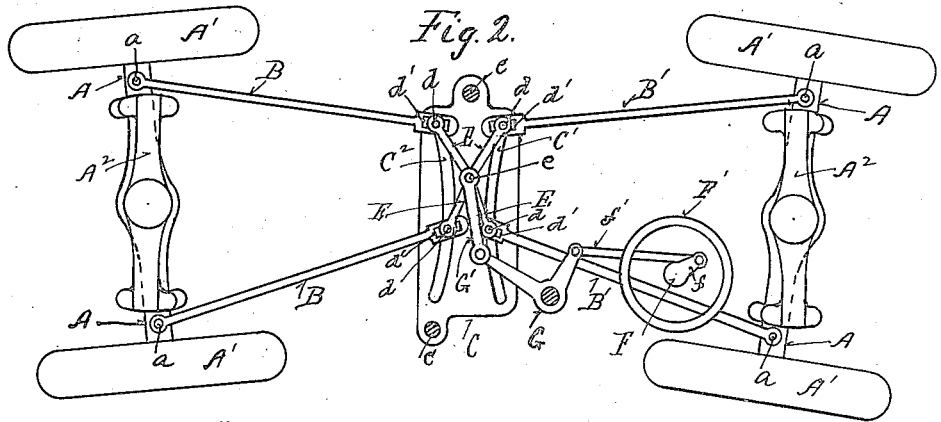
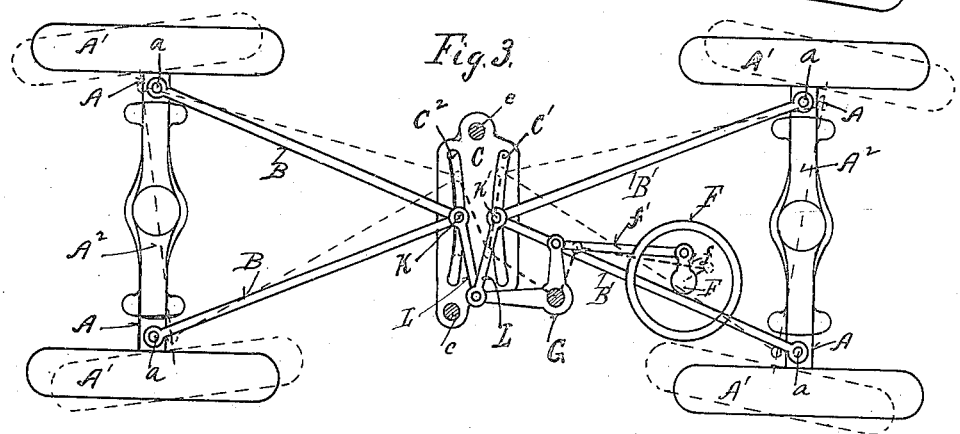

P. J. SMITH.
STEERING GEAR FOR MOTOR VEHICLES.
APPLICATION FILED MAY 31, 1913.
1,126,111.
Patented Jan. 26, 1915.
2 SHEETS—SHEET 2.
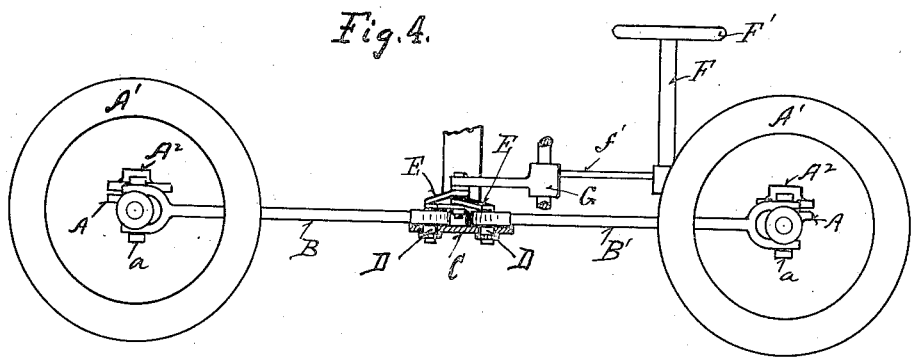
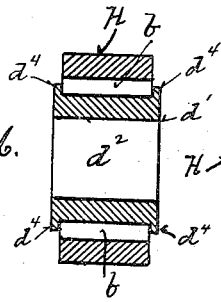
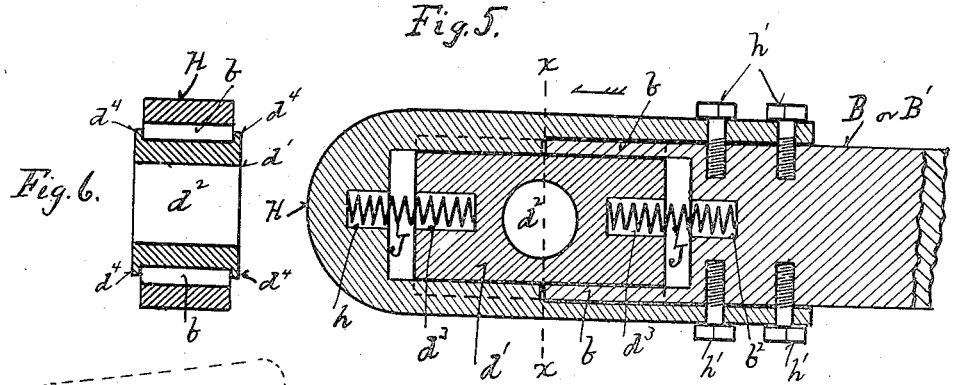
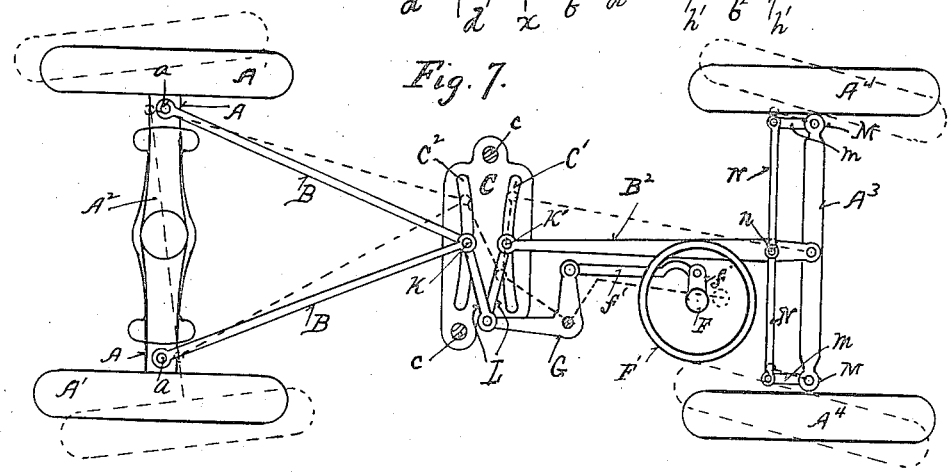
Witnesses.
E. E. Myers
P. V. Bifford
Inventor.
Paul J. Smith
By J. H. Armstrong
atty.

UNITED STATES PATENT OFFICE.

PAUL J. SMITH, OF GALETON, PENNSYLVANIA.

STEERING-GEAR FOR MOTOR-VEHICLES.

1,126,111. Specification of Letters Patent. Patented Jan. 26, 1915.

Application filed May 31, 1913. Serial No. 771,098.

*To all whom it may concern:*

Be it known that I, PAUL J. SMITH, a citizen of the United States, residing at Galeton, in the county of Potter and State of Pennsylvania, have invented certain new and useful Improvements in Steering-Gear for Motor-Vehicles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to motor vehicles, and has for its object the construction of steering gear therefor adapted to operate the front and rear wheels of a motor vehicle, for the purpose of giving direction to the motor vehicle.

The features of my invention are hereinafter pointed out and described, and are illustrated in the accompanying drawings in which:—

Figure 1, is a plan view of the running gear of a motor vehicle provided with my improved steering gear. Fig. 2, is a like view of the same with the front and rear axle moved to turn the vehicle. Fig. 3, is a plan view of a modification of the steering gear shown in Figs. 1 and 2. Fig. 4, is a side view of the running gear of a motor vehicle provided with my improved steering gear, with a portion of the supporting mechanism therefor in section. Fig. 5, is a sectional view of one of the pivot bearings of my invention. Fig. 6, is a transverse section of the same on the line $x$—$x$ in Fig. 5, looking in the direction of the arrow. Fig. 7, is a plan view of the running gear of a two wheel drive motor vehicle provided with my improved four wheel steering gear.

In these drawings, A, indicates the axles, A', indicates the wheels and A², indicates the bolsters of a motor vehicle. Pivoted to the axles A, by means of pivots $a$, are bars B and B', which bars extend underneath the body (not shown) of the vehicle, to the point substantially under the middle of said body, where they are supported in a horizontal position by means of a plate C, secured to the under side of the vehicle body by means of bolts $c$. The plate C, is provided with oppositely curved slots C' and C², in which flanged rollers D, (see Fig. 4) pivoted to said bars B and B', by means of the pivots $d$, operate to guide the lateral movement of said bars B and B'.

Secured upon the pivots $d$, on each of the bars B and B', are links E; the opposite ends of said links E, being placed upon a common pivot $e$.

For operating the mechanism hereinbefore described, I provide a steering post F, and hand wheel F', the post F, being provided at its lower end with a lever $f$. Secured to the vehicle body (not shown) I mount a bell-crank lever G, which is connected to the lever $f$, by means of a rod $f'$, and the other end of said bell-crank lever is connected to the pivot $e$, by means of a link G'.

In Fig. 2, the steering gear mechanism hereinbefore described, is shown as having been operated to turn the vehicle to the right.

I have found it advantageous to provide the pivot $d$, with yielding bearing blocks $d'$, (see Figs. 5 and 6). The bars B or B', are cut away at their ends so as to leave arms $b$, projecting therefrom, and are provided with a longitudinal recess $b^2$; the bearing block $d'$, provided with a pivot opening $d^2$, for the reception of the pivot $d$, and having longitudinal recesses $d^3$, in each end thereof, is inserted between the arms $b$, on the bar B. The pivot block $d'$, is provided with longitudinal flanges, $d^4$, adapted to embrace the sides of the arms $b$, on the bar B. I then place upon the bar B, a U-shaped strap or yoke H, which is provided with a recess $h$, and is adapted to fit in between a portion of the flanges $d^4$, on the block $d'$, and over the outsides of the arms $b$, on the bar B, and is secured on the bar B, by means of bolts $h'$. In the openings $b^2$, $d^3$, and $h$, I place springs J, which are adapted to normally maintain the block $d'$, in an intermediate position between the bar B, and yoke H, while permitting the absorption of shocks.

In the construction shown in Fig. 3, the bars B, are joined upon a common pivot K, and the bars B', upon a common pivot K', to which pivots K, and K', links L, are secured, and lead to one arm of the bell-crank lever G. In all other respects the gear shown in Fig. 3, is the same as that shown in Figs. 1, 2 and 4.

The steering gear shown in Fig. 7, is a modification of my invention hereinbefore described, by means of which my improved steering gear may be adapted for use upon a motor vehicle having a front axle and steering knuckles of usual and ordinary construction.

In Fig. 7, A, indicates the rear axle, A′, the rear wheels, A², the rear bolster, A³, the front axle, and A⁴, the front wheels of the motor vehicle, and B, indicates the bars for steering the rear wheels A′; M, indicates the steering knuckles upon the front axle, A³, upon which the wheels A⁴, are mounted, and m, indicates the knuckle levers. Pivoted upon the axle A³, is a bar B², the rear end of which is supported upon the plate C, and is provided with a roller D, as shown in Fig. 4, which operate in the slot C′, in the plate C. Links N, are pivoted to the ends of the knuckle levers m, and extend to and are pivoted to a common pivot n, on the bar B².

For operating the steering gear as shown in Fig. 7, I provide a steering post and hand wheel F′, the steering post having a lever f, at its lower end, from which lever f, a link f′, leads to one arm of the bell-crank lever G, the other arm of which is connected to the bars B, and B², by means of the links L.

The operation of turning the motor vehicle provided with the form of steering gear shown in Fig. 7, is illustrated by broken lines in said figure, and it is therefore believed that further description thereof is unnecessary.

Having thus fully described and illustrated my invention, so as to enable others to utilize the same, what I claim as new and desire to secure by Letters-Patent, is:—

1. The combination in a motor vehicle, of front and rear axles, front and rear steerable wheels secured on said axles, steering bars secured to the front and rear axles, links connecting the free ends of said bars, a bell-crank lever, one arm of which is pivoted to said links, a steering post, an arm thereon, and a link pivoted to and extending between said arm and the other arm of said bell-crank lever, substantially as and for the purpose set forth.

2. The combination in a motor vehicle, of front and rear axles front and rear steerable wheels secured on said axles, bars secured to the front and rear axles, resiliently supported pivot bearing blocks secured in the free ends of said bars, a slotted plate adapted to support the free ends of said bars, rollers in the slots in said plate, and mounted upon pivots secured in said pivot bearing blocks, links connecting the free ends of said bars, and lever and link mechanism adapted to impart lateral movement to the free ends of said bars, substantially as and for the purpose set forth.

3. The combination in a motor vehicle, of centrally pivoted front and rear axles, wheels secured thereon, bars secured to said axles, a transversely slotted plate to support the free ends of said bars, pivot bearing blocks resiliently supported in the free ends of said bars, rollers in the slots in said plate and mounted upon pivots secured in said blocks, links secured at one end to each of said bars, a common pivot pin upon which the other ends of said links are secured, and lever and link mechanism connected to said common pivot pin adapted to impart lateral movement to said bars, substantially as, and for the purpose set forth.

In testimony whereof I affix my signature, in presence of two witnesses.

PAUL J. SMITH.

Witnesses:
W. H. WARD,
J. A. CONNERS.